2,878,281
PREPARATION OF AMINO BENZOIC ACIDS

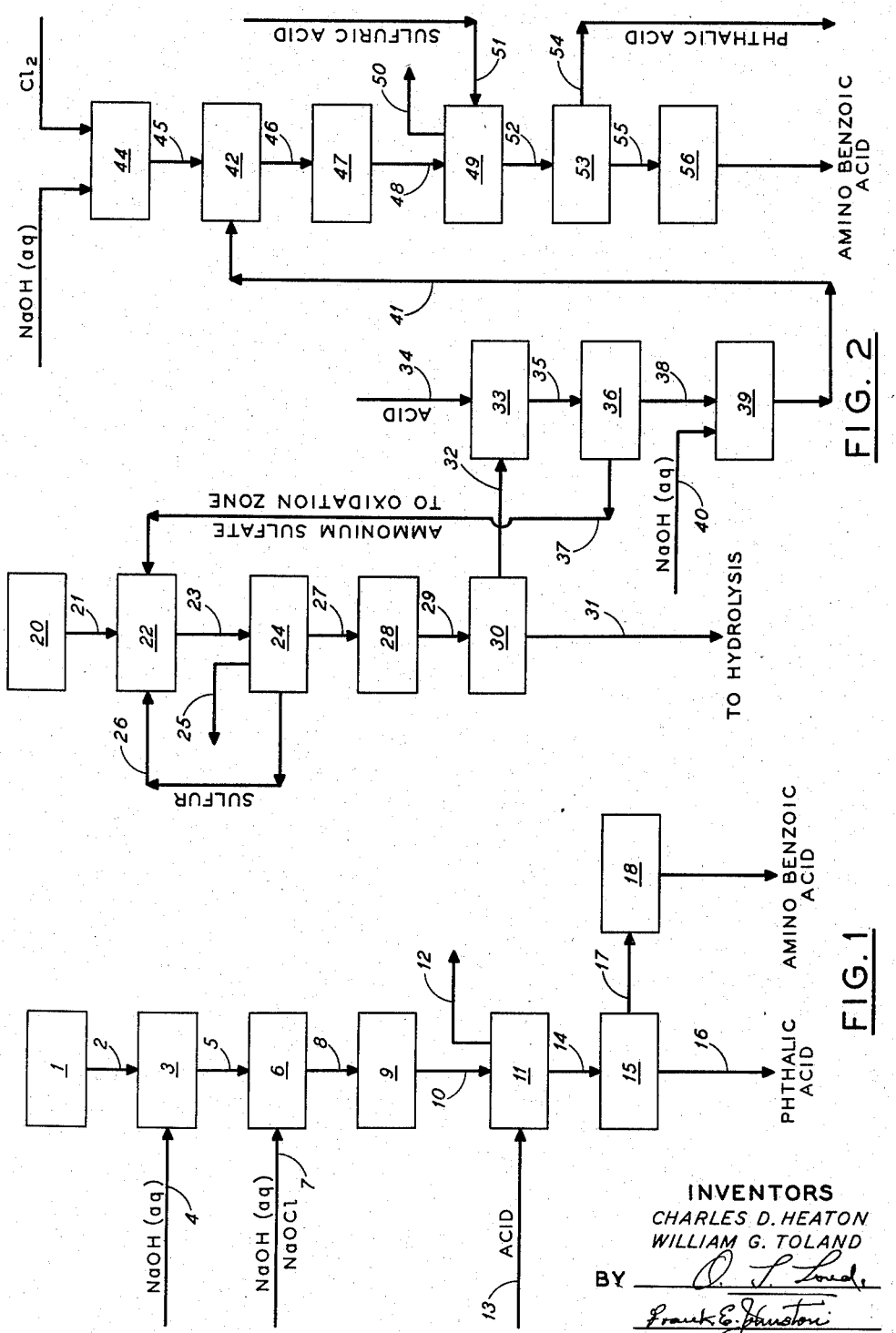

William G. Toland and Charles D. Heaton, San Rafael, Calif., assignors to California Research Corporation, San Francisco, Calif., a corporation of Delaware Application September 29, 1955, Serial No. 537,407

6 Claims. (Cl. 260—518)

This invention relates to a process for the preparation of amino benzoic acids. More particularly, this invention is concerned with a process for the preparation of pure amino benzoic acid and pure phthalic acid from starting mixtures containing phthalic acid, phthalic acid monoamide and phthalic acid diamide. For the purposes of this invention, the phthalic acids and corresponding amides may be either isophthalic or terephthalic acids or amides. A feed material containing phthalic acids and phthalic acid amides of one isomer only is required if phthalic acid and amino benzoic acid products of a single isomer are desired.

Amino benzoic acids are used extensively as dye intermediates and in pharmaceutical preparations. The para-amino benzoic acid is also of outstanding biological importance, being classified as a vitamin and belonging in the B complex. At present, however, the amino benzoic acids are expensive chemicals, being prepared primarily by the reduction of nitro benzoic acids.

An object of this invention is to provide a method whereby a mixture of phthalic acid, phthalic acid monoamide and phthalic acid diamide can be processed to yield pure phthalic acid and pure amino benzoic acid.

Another object of this invention is to provide a practical and economical method whereby a readily available starting material containing phthalic acid, phthalic acid monoamide and phthalic acid diamide can be processed to provide essentially quantitative yields of pure amino benzoic acid and pure phthalic acid.

The invention contemplates broadly the conversion of a mixture of phthalic acid, phthalic acid monoamide and phthalic acid diamide to yield a reaction product from which pure phthalic acid and the corresponding pure amino benzoic acid may be recovered. In carrying out the invention, the aforesaid mixture is contacted with an aqueous mixture of an alkali and hypochlorite, e. g., sodium hydroxide and sodium hypochlorite, to yield a product solution containing salts of phthalic acid and of amino benzoic acid. These salts are converted to the free acids, the latter then being recovered separately from the solution and purified. By a preferred method of separation, the solution is acidified to produce a slurry of precipitated phthalic acid together with a solution containing amino benzoic acid. The solid phthalic acid is separated, as by filtration, centrifugation, or the like, and amino benzoic acid is thereafter recovered from the solvent, as by fractional crystallization, extraction, salting out, or the like. Recrystallizations, i. e., from water, may be effected to yield products of even higher purity.

In accordance with the invention, a feed material of phthalic acid, phthalic acid monoamide and phthalic acid diamide is contacted with an aqueous mixture of an alkali and a hypochlorite, sodium hydroxide and sodium hypochlorite being preferred for economic reasons. In order to prevent undesired decomposition of the sodium hypochlorite induced by an acidic feed material, it is preferred to first contact the feed, containing phthalic acid, phthalic acid monoamide and phthalic acid diamide, with sufficient aqueous sodium hydroxide to form the corresponding salts. It has been found that contacting such an acidic feed material, or preferably the salts thereof, with an aqueous mixture of sodium hydroxide and sodium hypochlorite results in a novel reaction which produces salts of phthalic acid and amino benzoic acid together with other reaction products including sodium carbonate and sodium chloride.

Quantitative comparisons of the reaction products with the feed material composition indicate that while the amide groups of the phthalic acid monoamide are converted to amine groupings by the process described, the amide groups of the phthalic acid diamide are converted, not to amine groups, but to carboxyl groups, so as to form the corresponding phthalic acid rather than the corresponding diamine. This unpredictable reaction, leading to a product of phthalic acid and amino benzoic acid free of contaminating phenylene diamines, results in appreciable simplification and concurrently reduced costs in recovering pure phthalic acid and amino benzoic acid. Carboxyl groups present in the original feed appear to remain unchanged during the reaction.

Stoichiometrically, 1 mol of sodium hypochlorite and 2 mols of sodium hydroxide are required for each mol of amide content in the contacted solid. If excess sodium hypochlorite is used in the reaction, it can be destroyed by the addition of a reducing agent, such as sodium thiosulfate, before separation procedures are undertaken to recover the amino benzoic acid product.

In carrying out the process of this invention, it has been found that the production of amino benzoic acid is most efficient when the mixture of phthalic acid and phthalic acid amides is contacted with the aqueous sodium hypochlorite and sodium hydroxide at a low temperature, as below 60° F., and the resultant mixture then heated to the desired reaction temperature. The best yields have been obtained at reaction temperatures of 180° to 212° F., although the reaction will proceed at temperatures in the range 95° to 212° F. Moreover, it has been observed that yields of amino benzoic acid are highest when the desired temperature of the reaction is achieved rapidly, probably because side reactions are minimized. A suitable method of accomplishing this preferred sequence is to contact the mixture of phthalic acid and phthalic acid amides with the solution of sodium hypochlorite and sodium hydroxide at lower temperatures, e. g., at about 55° F., and then to add the resultant mixture slowly to water at a temperature of 212° F. so that a high temperature is rapidly achieved and maintained. The mixture is held at the desired temperature for a period sufficient to give the degree of conversion desired. A period of ½ hour to 2 hours at the elevated reaction temperature generally is sufficient to give yields of amino benzoic acid of at least 75%.

The advantage of the preferred reaction sequence as described may be explained if the reaction is assumed to occur in two stages, involving the formation of an intermediate at the lower temperature of mixing, which then reacts further at the elevated temperature to produce amino benzoic acid.

Since the reaction with the sodium hypochlorite proceeds more satisfactorily when the hypochlorite has been freshly prepared, an advantageous way of proceeding is to prepare this reagent by reacting elemental chlorine with an excess of cold aqueous sodium hydroxide and removing the heat of reaction to prevent decomposition of the sodium hypochlorite. The resultant cold mixture of sodium hypochlorite and sodium hydroxide is then added directly to the mixture of phthalic acid and phthalic acid amides.

Although the use of sodium hydroxide and chlorine in this preparation of amino benzoic acids is preferred, alternative reactants may be substituted. Thus, other strong alkalies such as potassium hydroxide may be used in place of sodium hydroxide. Similarly, bromine may be used in place of chlorine, although the latter is preferred for economic considerations.

Following contact with aqueous sodium hydroxide and sodium hypochlorite, the phthalic acid and amino benzoic acid products are separated from the reaction product and purified. In one favorable method of accomplishing this separation, the reaction product containing phthalic acid and amino benzoic acid salts is acidified, e. g., to a pH less than 3, advantageously around 2, to precipitate phthalic acid which is recovered, as by filtration, leaving amino benzoic acid dissolved in the filtrate. Since the precipitated phthalic acid crystals are observed to occlude amino benzoic acid on the crystal surface, the phthalic acid is washed as with water or dilute acid, e. g., from .001 to .1 molar hydrogen ion concentration, to remove the occluded amino benzoic acid, the washings being added to the filtrate. Impurities and color bodies in the filtrate can be removed, as by extraction with benzene. The pH of the solution is then raised to a value of about 3 to about 5 and the amino benzoic acid recovered by extraction, as with ether, salting out, as with sodium sulfate, crystallization, distillation of the solvent, or the like, and recrystallized to yield a purified product. A filtrate pH of about 3.5 is preferred during recovery of the amino benzoic acid, since the solubility of the latter in the filtrate is least at this value. Alternatively, color bodies and impurities may be removed following recovery of the amino benzoic acid from the filtrate, as by contacting the amino benzoic acid with benzene.

One advantageous method of utilizing the present invention employs a feed stock obtained by sulfate oxidation of a xylene, as exemplified in co-pending application Serial No. 202,389, now Patent No. 2,722,546. The reaction as considered here is a method for oxidizing alkyl aromatic hydrocarbons, such as xylenes, by heating the alkyl aromatic hydrocarbon with ammonium sulfate, a sulfide, such as hydrogen sulfide or ammonium sulfide, and water to a temperature from about 550° F. to the critical temperature of water under a superatmospheric pressure sufficient to maintain a part of the water in liquid phase. The hot reaction product so produced is a mixture of ammonium phthalates and phthalic acid amides having the formulas:

$\phi(COONH_4)_2$, $\phi(CONH_2)_2$, $NH_2OC\phi COONH_4$

The material prepared by such oxidation is then steam-stripped to remove carbon dioxide, hydrogen sulfide, ammonia and some water, and to precipitate a sulfur phase which is removed. The aqueous oxidation product is then treated with activated charcoal and filtered to yield a filtrate freed of color bodies and impurities formed during the oxidation process. If the amount of feed material exceeds that required for the desired production of amino benzoic acid, a part of the feed may be diverted at this point for subsequent hydrolysis and conversion to phthalic acid.

The feed material containing salts, e. g., the ammonium salts, and amides of the phthalic acid is acidified, e. g., to a pH of 3 or lower, to produce a slurry of phthalic acid, phthalic acid monoamide and phthalic acid diamide which are then recovered, as by filtration, for subsequent contact with sodium hypochlorite and sodium hydroxide. Conversion of ammonium salt groupings in the feed stock to the carboxyl groupings before contact with sodium hypochlorite is especially desirable in reducing consumption of the sodium hypochlorite and in eliminating the production of undesirable by-products, including the explosive and highly dangerous nitrogen trichloride. Mineral acids, such as hydrochloric, sulfuric, or the like, are especially suitable for such acidification because of the ease of removal of the inorganic salts formed. As will occur to those skilled in the art, when the feed material is obtained from the oxidation process, previously described, acidification with sulfuric acid is advantageous in that the ammonium salt thereby produced may be recycled for use in the oxidation reaction.

The invention may be more fully understood by reference to the accompanying drawings in which:

Figure 1 sets forth in diagrammatic form an arrangement of equipment and process flow suitable for the practice of the invention using a feed stock of phthalic acid, phthalic acid monoamide and phthalic acid diamide, irrespective of origin.

Figure 2 sets forth in diagrammatic form an arrangement of equipment and process flow embodying integration of the invention with a process producing a feed stock of salt, salt amide and diamide of a phthalic acid by the sulfate oxidation of a xylene, as previously described.

Referring to Figure 1, a feed material consisting of phthalic acid, phthalic acid monoamide and phthalic acid diamide held in vessel 1 is passed through line 2 to zone 3 where it is contacted with aqueous sodium hydroxide, introduced through line 4, to convert the acid groupings to the corresponding sodium salt groupings. The salt and amide mixture is then removed through line 5 to zone 6 where it is intimately contacted with a mixture of aqueous sodium hydroxide and sodium hypochlorite introduced through line 7. Both zones 3 and 6 are preferably equipped with cooling means, such as a water jacket, heat exchanger, or the like, so that the resultant mixture in zone 6 is achieved and maintained at a low temperature, i. e., 55° F. or below. The cold mixture is then conducted through line 8 to zone 9 where a rapid elevation in temperature is achieved to the desired reaction temperature, preferably 180° to 212° F., as by contact with water at 212° F. The solution is maintained at 180° to 212° F. for a time sufficient to assure maximum conversion to amino benzoic acid, usually about 60 minutes being sufficient. The hot aqueous reaction product mixture containing salts of phthalic acid and amino benzoic acid together with sodium carbonate and sodium chloride is then removed through line 10 to precipitator 11 where it is contacted with acid introduced through line 13 and acidified, e. g., to a pH below 3, to precipitate phthalic acid. The precipitator 11 is equipped with a vent 12 to allow the escape of carbon dioxide. The slurry is removed through line 14 to zone 15 where the phthalic acid is separated, as by filtration, and removed through line 16. The precipitate is washed with water or dilute acid to remove occluded amino benzoic acid, the washings being added to the filtrate. The filtrate and washings are then adjusted to a pH of 3.5 and passed through line 17 to zone 18 where successive extractions, as with ether, or salting out, as with sodium sulfate, are made to recover amino benzoic acid. If extraction is employed, the amino benzoic acid can be recovered from the extracting liquid, as by distillation of the latter. If desired, the product can be further purified by recrystallization from water.

Referring to Figure 2, a crude oxidation product of phthalic acid, phthalic acid monoamide and phthalic acid diamide is prepared by conducting a meta- or para-xylene feed stock from vessel 20 through line 21 to sulfate oxidation zone 22 for oxidation with ammonium sulfate, hydrogen sulfide, or ammonium sulfide and water, according to the oxidation reaction previously described. The product is then removed through line 23 to stripping zone 24 where the reaction product is stripped with steam to remove carbon dioxide, hydrogen sulfide, ammonia and some water through an overhead line 25. The stripped oxidation product accumulates in the lower portion of stripper 24 where a lower liquid sulfur phase separates from an upper aqueous phase containing phthalic acid values. The sulfur phase is removed through line 26 for recycling and re-use in the oxidation reaction. The aqueous phase is withdrawn from stripper 24 through line 27 and passes into clarification zone 28 where activated charcoal is added. The mixture is then led through line 29 to filter 30 and filtered to remove any color bodies which may have been formed. That part of the clarified oxidation product not required for amino benzoic acid production may then be conducted through line 31 for hydrolysis and conversion to pure phthalic acid.

The portion of clarified oxidation product intended for conversion to amino benzoic acid is then removed through line 32 to a precipitator 33 where it is acidified with sulfuric acid, introduced through line 34, sufficient to lower the pH to a value of 3 or less, thereby precipitating phthalic acid and amides of phthalic acid. The resultant slurry is transferred through line 35 and the solids recovered, as by filtration at filter 36. Ammonium sulfate produced during acidification is removed through line 37 for recycling to the oxidation zone.

The solids are removed through line 38 to zone 39, which is equipped with cooling means, and neutralized with aqueous sodium hydroxide introduced through line 40. The resultant cold salts are removed through line 41 to zone 42 for contact with a mixture of cold sodium hypochlorite and sodium hydroxide. The latter mixture is advantageously prepared by reacting chlorine and excess aqueous sodium hydroxide in zone 44, equipped with cooling means, to yield a cold aqueous mixture of sodium hydroxide and sodium hypochlorite, withdrawing the product through line 45, and passing to zone 42.

Zone 42 also is equipped with cooling means to maintain the mixture of the oxidation product together with sodium hydroxide and sodium hypochlorite at a reduced temperature, i. e., below 60° F. The reaction mixture is then passed through line 46 to zone 47 where it is subjected to heating, as by contact with water at 212° F., so as to effect a virtually instantaneous rise in temperature to 180°–212° F. The solution is maintained at 180°–212° F. for a time sufficient to assure a maximum conversion to amino benzoic acid, about 60 minutes generally being sufficient. The aqueous reaction product containing salts of phthalic acid and amino benzoic acid, together with sodium chloride and sodium carbonate, is then removed through line 48 to precipitator 49 where sulfuric acid is added through line 51 to reduce the pH to a value below 3, i. e., to a value of about 2. The precipitator 49 is equipped with a vent 50 to allow the escape of carbon dioxide. Phthalic acid is liberated by the acidification. The slurry is withdrawn through line 52 and the phthalic acid separated, as by filtration at filter 53. The recovered crystals of pure phthalic acid are washed with dilute sulfuric acid, i. e., of pH about 2, to remove occluded amino benzoic acid and recovered through line 54, the washings being added to the filtrate. The filtrate and washings are passed through line 55 and contacted with hot benzene in separation and purification zone 56 to remove some benzene-soluble acids, such as benzoic and toluic, together with color bodies and various impurities, such as tar, produced during the oxidation reaction. The solution pH is then adjusted to about 3.5 and the amino benzoic acid separated from the aqueous solution, i. e., by successive extraction with ether, or salting out with sodium sulfate. If extraction with ether is used, distillation of the latter leaves the pure amino benzoic acid product.

The following examples illustrate in detail the preparation of amino benzoic acids from the hot reaction product obtained by the oxidation of a xylene and containing a mixture of salt, amide salt and diamide of a phthalic acid.

Example 1

800 cc. of hot aqueous oxidation product, obtained from the oxidation of para-xylene with ammonium sulfate, hydrogen sulfide and water under the oxidation conditions previously described, are boiled and agitated for 4 hours to remove carbon dioxide, hydrogen sulfide and ammonia, sufficient water being added to maintain a constant volume. The mixture is filtered to remove a precipitate containing elemental sulfur. 12 g. of activated charcoal are added to the filtrate and the mixture held at a temperature of 180° F. for 20 minutes. Filtration through diatomaceous earth removes color bodies formed during the oxidation process and yields a pale yellow filtrate. The filtrate is acidified with sulfuric acid to a pH of 3 or less to precipitate approximately 49 g. of white solid, comprising a mixture of terephthalic acid and amides of terephthalic acid, which are removed by filtration. This solid is then washed with water at 200° F. and redissolved in 200 cc. of water containing 28.6 g. of sodium hydroxide.

A mixture of sodium hypochlorite and sodium hydroxide is prepared by adding 27.5 g. of chlorine to a vessel equipped with cooling means and containing a solution of 50 g. of sodium hydroxide in 375 cc. of water, thereafter adding sufficient water to produce 500 cc. of solution. 190 cc. of this cold solution are slowly added to the acid-amide solution previously prepared so as to keep the temperature of the mixture below 55° F. The mixture is stirred for 15 minutes and then heated rapidly to 200° F. and maintained at that temperature for one hour. 2 g. of sodium thiosulfate are added to consume excess sodium hypochlorite. The solution is acidified to a pH of 3 or less and filtered hot. The filter cake, comprising about 26.9 g. of terephthalic acid, is then suspended in 300 cc. of dilute sulfuric acid of pH about 2, heated to 200° F. and filtered hot. The filtrates are combined, cooled, and extracted with three successive 200 cc. portions of ether. The pH of the filtrate is then raised to 3.5 with sodium hydroxide and the filtrate extracted with six successive 200 cc. portions of ether to yield the balance of the product. The crude para-amino benzoic acid product is recovered by evaporation of ether and is suspended in hot benzene, cooled and filtered to remove benzoic and toluic acids together with small amounts of impurities soluble in the filtrate. Recrystallization of the product from 200 cc. of water yields 14.5 g. of light tan needles of para-amino benzoic acid having an acid number of 411 (theoretical value 409).

Example 2

800 cc. of hot aqueous oxidation product obtained from the oxidation of para-xylene, as in Example 1, are stripped with steam to remove carbon dioxide, hydrogen sulfide, ammonia and sulfur, and are then mixed with 12 g. of activated charcoal and the mixture filtered to remove color bodies and impurities formed during the oxidation. The filtrate is acidified with sulfuric acid to a pH of 3 or less to precipitate approximately 50 g. of a white solid comprising a mixture of terephthalic acid and amides of terephthalic acid, which are removed by filtration. This solid is then washed with water at 200° F. and redissolved in 200 cc. of water containing 28.6 g. of sodium hydroxide.

190 cc. of a cold solution of sodium hypochlorite and sodium hydroxide, prepared as in Example 1, are slowly added to the acid-amide solution, previously prepared, so as to keep the temperature of the mixture below 55° F. The solution is then added to 200 cc. of water at 212° F. with heating and stirring to assure continuous boiling. The boiling is continued for 40 minutes. 3 g. of sodium thiosulfate in 100 cc. of water are added to destroy excess sodium hypochlorite, the solution acidified to a pH of 3 or less, and filtered hot. The filter cake is washed with 300 cc. of dilute sulfuric acid of pH about 2 and filtered hot to produce about 28.7 g. of a terephthalic acid precipitate having an acid number of 667 (theoretical value 675). The combined filtrates and washings are cooled and washed with two successive 200 cc. portions of hot benzene to remove benzoic and toluic acids and small amounts of impurities. The pH of the filtrate is then adjusted to about 3.5 with 10% sodium hydroxide and extracted with ether for 10 hours in a liquid-liquid extractor. Evaporation of ether yields 15.7 g. of para-amino benzoic acid.

*Example 3*

250 cc. of a hot aqueous oxidation product obtained from the oxidation of meta-xylene with ammonium sulfate, hydrogen sulfide and water under the conditions previously described are stripped with steam to remove carbon dioxide, hydrogen sulfide, ammonia and sulfur and is then mixed with 12 g. of activated charcoal and the mixture filtered to remove color bodies and impurities formed during the oxidation. The filtrate is acidified with sulfuric acid to a pH of about 2 to precipitate approximately 45 g. of a white solid, comprising a mixture of isophthalic acid and amides of isophthalic acid, which are removed by filtration. This solid is then washed with water at 200° F. and redissolved in 200 cc. of water containing 28.6 g. of sodium hydroxide.

190 cc. of a cold solution of sodium hypochlorite and sodium hydroxide, prepared as in Example 1, are slowly added to the acid-amide solution so as to keep the temperature of the mixture at about 55° F. The solution is then added to 200 cc. of water at 175° F. with continued heating and stirring to maintain constant temperature for 40 minutes. 3 g. of sodium thiosulfate in 100 cc. of water are added to destroy excess sodium hypochlorite, the solution acidified to a pH of 3 or less, and filtered hot. The filter cake is washed with 300 cc. of dilute sulfuric acid of pH about 2 and filtered hot to produce 21.3 g. of isophthalic acid having an acid number of 677 (theoretical value 675). The combined filtrates and washings are cooled and washed with two successive 200 cc. portions of hot benzene to remove benzoic and toluic acids and small amounts of impurities. The pH of the filtrate is then adjusted to about 3.5 with 10% sodium hydroxide and extracted with ether for 10 hours in a liquid-liquid extractor. Evaporation of ether yields 17.8 g. of meta-amino benzoic acid. Recrystallization from water yields 17.3 g. of purified meta-amino benzoic acid having a melting point (176° C. sinter) of 172° to 176° C.

Recrystallization from chloroform or benzene yields a product having a melting point of 173.5–175.5° C.; from ethyl alcohol, a product having a melting point (171° C. sinter) of 175° to 177° C.

It should be understood that the term "phthalic acid" as used in this application includes both isophthalic and terephthalic acid. Alkyl - substituted isophthalic and terephthalic acids and amides, such as 5-t-butyl isophthalic acid and amide, react in a manner similar to that observed and described for the unsubstituted acids and amides.

We claim:

1. A process for producing a mixture of a phthalic acid and an aminobenzoic acid from a mixture consisting essentially of a phthalic acid, a phthalic acid monoamide, and a phthalic acid diamide, wherein said phthalic acid is selected from the class consisting of isophthalic acid and terephthalic acid which comprises contacting said mixture with aqueous sodium hydroxide and sodium hypochlorite at a contacting temperature below the reaction temperature, rapidly elevating the reaction temperature to from 95° to 212° F., acidifying the reaction mixture to produce an aqueous mixture containing said phthalic acid and corresponding aminobenzoic acid, and separating each of these acids from said aqueous mixture.

2. A process for producing a mixture of a phthalic acid and an aminobenzoic acid from a mixture consisting essentially of a phthalic acid, a phthalic acid monoamide, and a phthalic acid diamide, wherein said phthalic acid is selected from the class consisting of isophthalic acid and terephthalic acid which comprises contacting said mixture with aqueous sodium hydroxide and sodium hypochlorite at a contacting temperature below the reaction temperature, rapidly elevating the reaction temperature to from 95° to 212° F., acidifying the reaction mixture to precipitate said phthalic acid leaving aminobenzoic acid in liquid phase, separating said phthalic acid from said liquid phase, and recovering the corresponding aminobenzoic acid from the liquid phase.

3. The process of claim 2, characterized further in that said aminobenzoic acid is recovered from said liquid phase by extracting the liquid phase with ether.

4. The process of claim 2, characterized further in that said liquid phase is washed with benzene and said aminobenzoic acid is then recovered from said liquid phase by extracting the liquid phase with ether.

5. A process for producing isophthalic acid together with meta-aminobenzoic acid, which comprises contacting a mixture consisting essentially of isophthalic diamide together with some isophthalic acid monoamide and some isophthalic acid, with aqueous sodium hydroxide and sodium hypochlorite at a contacting temperature below the reaction temperature, rapidly elevating the reaction temperature to from 95° to 212° F., acidifying the reaction mixture to produce an aqueous mixture containing isophthalic acid and meta-aminobenzoic acid and separating each of these acids from said aqueous mixture.

6. A process for producing terephthalic acid together with para-aminobenzoic acid, which comprises contacting a mixture consisting essentially of terephthalic diamide together with some terephthalic acid monoamide and some terephthalic acid, with aqueous sodium hydroxide and sodium hypochlorite at a contacting temperature below the reaction temperature, rapidly elevating the reaction temperature to from 95° to 212° F., acidifying the reaction mixture to produce an aqueous mixture containing terephthalic acid and para-aminobenzoic acid and separating each of these acids from said aqueous mixture.

References Cited in the file of this patent

UNITED STATES PATENTS 2,722,546     Toland     Nov. 1, 1955

OTHER REFERENCES

Wallis et al.: Organic Reactions, vol. 3, pg. 278 (1946).

Fieser et al.: Organic Chemistry, 2nd ed., pgs. 228–9 (1950).

Wagner et al.: Synthetic Organic Chemistry, pg. 415 (1953).

Rodd Chemistry of Carbon Compounds, vol. 3a, pg. 576 (1954).